United States Patent [19]

Restrepo

[11] Patent Number: 4,779,088
[45] Date of Patent: Oct. 18, 1988

[54] COLLISION DETECTION ARRANGEMENT FOR DAISY CHAIN CONFIGURATIONS

[75] Inventor: Mario A. Restrepo, Ocean, N.J.

[73] Assignees: American Telephone and Telegraph Company; AT&T Information Systems Inc., Murray Hill, N.J.

[21] Appl. No.: 799,152

[22] Filed: Nov. 18, 1985

[51] Int. Cl.$^4$ .......................... H04Q 5/00; H04J 3/02; H04B 7/00
[52] U.S. Cl. ............................ 340/825.5; 340/825.05; 370/85; 370/86; 455/58
[58] Field of Search ........... 340/825.5, 825.05, 825.51; 370/85, 86, 93; 455/58

[56] References Cited

U.S. PATENT DOCUMENTS

| | | | |
|---|---|---|---|
| 4,384,363 | 5/1983 | Lipcon | 340/825.5 |
| 4,390,990 | 6/1983 | Ainsworth | 340/825.5 |
| 4,412,347 | 10/1983 | Lipcon | 455/58 |
| 4,476,467 | 10/1984 | Terwilliger et al. | 370/85 |
| 4,531,238 | 7/1985 | Rawson et al. | 340/825.5 |
| 4,649,548 | 3/1987 | Crane | 455/58 X |

OTHER PUBLICATIONS

*Modern Dictionary of Electronics*, 5th Edition; Rudolf F. Graf; p. 169; 1977.

Primary Examiner—Robert L. Griffin
Assistant Examiner—Ralph E. Smith
Attorney, Agent, or Firm—Gregory C. Ranieri

[57] ABSTRACT

Local area networks having a plurality of stations connected to a transmission medium in a daisy chain configuration at the nodes or endpoints experience difficulty in detecting collisions between signals transmitted from two or more stations using standard Manchester violation or lost carrier collision detection techniques. The present invention eliminates collision detection problems in this environment almost entirely by monitoring the signal level coupled from the transmission medium to each station of the daisy chain to detect the presence or absence of collisions and generating a collision detection output signal when the signal level being monitored exceeds a predetermined threshold level.

4 Claims, 2 Drawing Sheets

COLLISION DETECTION ARRANGEMENT FOR DAISY CHAIN CONFIGURATIONS

TECHNICAL FIELD

This invention relates to the field of local area communication networks and, more particularly, to the networks involving daisy chain nodes.

BACKGROUND OF THE INVENTION

Local area networks utilize a variety of collision detection techniques to provide efficient and potentially trouble-free media access. The collision detection techniques are selected in accordance with particular local area network attributes such as the type of signal encoding (FSK, OOK, PSK or the like), the type of multiple access scheme (TDMA, CSMA or the like), and the configuration of the network (bus, ring, star, etc.).

Collision detection techniques used with Manchester-encoded, carrier sense multiple access, local area networks, such as the STARLAN NETWORK, are separated into three distinct categories. The first collision detection technique searches for Manchester code violations in the data signal on the transmission medium in either a daisy chain or star configuration. A second collision detection technique recognizes two or more station nodes transmitting at the same time from a star configuration. Yet another collision detection technique involves the recognition of a lost carrier signal in either a daisy chain or star configuration.

Manchester encoded signals display the unique property that within each and every bit period there exists a transition from one state (high or low) to the opposite state (low or high, respectively). Interference from other signals can cause the Manchester encoded signal to exhibit a smeared, jittered or obliterated mid-bit transition. Such behavior at the mid-bit transition is known as a Manchester violation. Manchester violations are detected in either a daisy chain or star configuration by differential detection circuits and other similar techniques known in the art.

In the star configuration, a hub, which is centrally connected to each station node, detects energy signals from the nodes. Upon sensing signaling activity by two or more station nodes at the same time, the hub generates a signal indicative of the presense of a signal collision. The signal generated by the hub effectively jams all communication in the local area network and causes Manchester code violations to appear on the transmission medium. Station nodes in the star configuration detect this jamming signal and interpret the Manchester code violations as collisions.

Lost carrier collision detection is implemented at the station nodes, i.e., end points, of the local area network. When a station node transmits data and does not see its own carrier, that is, its own transmitted signal, returning after a predetermined time period, the station node assumes that a collision has occurred.

In a daisy chain configuration, the lost carrier collision detection technique theoretically detects collisions when two stations in the daisy chain begin simultaneous transmission with antipodal data signals. However, in practice, this technique even when augmented with a Manchester code violation collision detector fails to detect more than an insignificant number of collisions.

SUMMARY OF THE INVENTION

These and other problems in daisy chain configured nodes of local area networks are overcome, in accordance with the principles of this invention, by monitoring transmission medium voltage levels at each station of the daisy chain to detect the presense or absence of collisions.

BRIEF DESCRIPTION OF THE DRAWING

A more complete understanding of the invention may be obtained by reading the following description of a specific illustrative embodiment of the invention in conjunction with the appended drawing in which.

DETAILED DESCRIPTION

Figure 1:
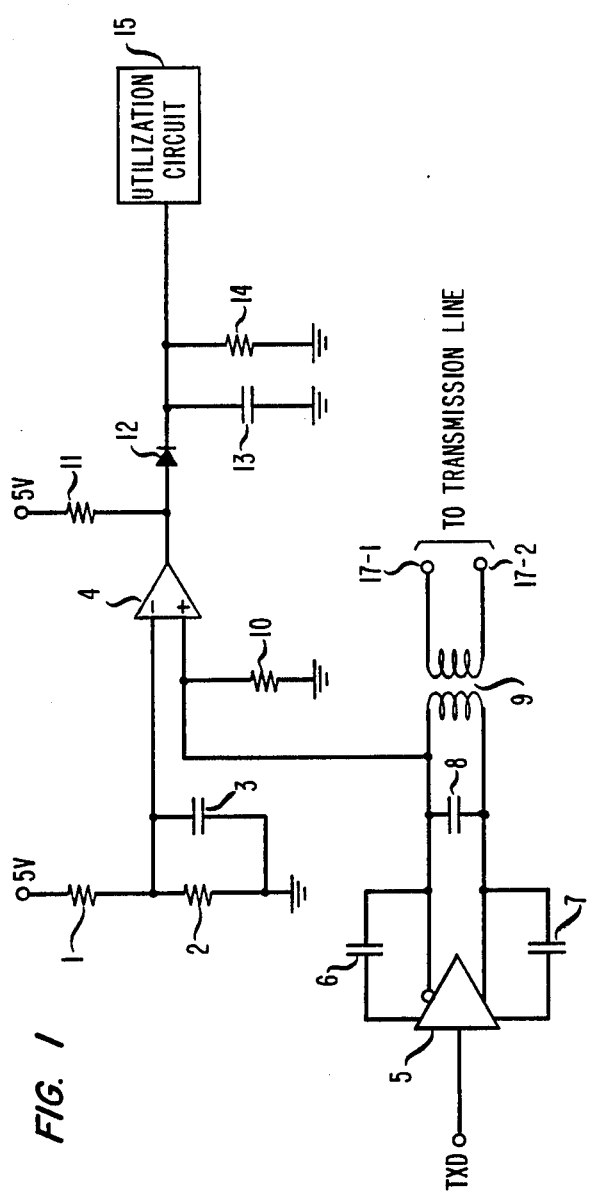
FIG. 1 is a schematic circuit diagram of a daisy chain collision detection circuit implemented in accordance with the principles of the invention.

Local area networks utilize a variety of transmission media including single or dual twisted pair wiring, optical fiber, single or dual coaxial cable, and the like. The networks may be configured in any number of ways including as a star or daisy chain or star/daisy chain combination. Regardless of the configuration of the entire local area network, it is only the daisy chain portion of the network which is of concern to the collision detection circuitry presented in this invention.

The daisy chain is a bus type network wherein each transmitting station is connected in parallel to the transmission medium. At the end of the daisy chain, transmitted signals are either returned directly to the receiving portion of the stations in the same manner or transmitted to higher levels in the local area network hierarchy before being returned to the receiving portions of the stations in the daisy chain.

The need for the present invention became apparent when it was discovered that lost carrier and Manchester code violation collision detection arrangements failed to detect significant numbers of collisions. Because of transmission medium characteristics, anomalies or failures, even antipodal data signals from transmitting stations in a daisy chain configuration cannot cancel each other. It was also discovered that the resultant signal caused by the interference of the two antipodal data signals generally does not exhibit Manchester code violations as expected. Hence, collisions are almost completely undetectable in the daisy chain configuration using standard collision detection techniques. It was also discovered that the resultant from two interfering data signals separated by less than 180 degrees phase difference also lacks Manchester code violations thereby preventing collision detection.

When one station in a daisy chain configuration is transmitting data signals, signal energy from the data signals of the transmitting station is coupled back into the output leads of the driver or transmitter circuits for the stations in the daisy chain because of the parallel connection between stations. It has been observed by me that, when a collision occurs, current changes are experienced at the output of each station. These current changes become more enhanced when the output is coupled to the transmission medium through a transformer or equivalent circuit whose response varies as a function of the change in current. But, it should be obvious to those skilled in the art that such coupling devices (transformers, etc.) can be omitted in the practice of this invention. Generally, current during a collision changes from a typical current to a short circuit current. This rapid change in current at the output of each station is translated into a voltage spike in the collision detection arrangement. By monitoring voltage level changes translated back from the transmission medium in accordance with the principles of this invention, collisions can be detected with almost 100% accuracy using level or threshold detection.

FIG. 1 shows an exemplary embodiment of the invention which is included in each station of the daisy chain configuration. The embodiment of the invention shown in FIG. 1 includes, in unique combination, the following major component circuits: a line driver circuit, a threshold comparison circuit, and a pulse stretching circuit. Transmit data signal, signal TXD, is supplied to the line driver circuit when additional circuitry internal to the corresponding station determines that it is safe to attempt a data transmission. The transformer-coupled line driver circuit supplies one output to the comparison circuit and a second output to the transmission medium. A threshold reference level in the threshold comparison circuit is compared to the signal from the driver circuit. If the threshold reference level, is exceeded, then the comparison circuit generates an output signal accordingly. In general, the output signal generated by the comparison is of short duration. Thus, it is necessary to stretch or hold the output signal at the active or indicative level long enough for utilization circuit 15 to detect the signal that a collision is taking place.

In the line driver circuit, transmitted data (TXD) is supplied to differential line driver 5. A differential line driver is used to obtain a dual output signal for transmission on the exemplary two wire transmission medium. Other types of drivers are available for use with the particular transmission medium chosen for the local area network. Slew rate control for the line driver 5 is provided by well-known methods using capacitors 6, 7 and 8. Both outputs of differential line driver 5 are supplied to coupling transformer 9. Coupling transformer 9 is connected via terminals 17-1 and 17-2 in circuit to the twisted pair transmission medium of the daisy chain. One of the dual output signals from differential line driver 5 is supplied to the second input of comparator 4.

In the threshold comparison circuit, resistors 1 and 2 and capacitor 3 provide a predetermined reference threshold voltage to a first input of comparator 4. Resistor 10 connected to the second input of comparator 4 provides a current sink path to return the input of by comparator 4 to a low idle condition. That is, resistor 10 discharges residual energy built up in coupling transformer 9. It is necessary to achieve this low idle condition prior to transmission of the next data signal in order to facilitate correct detection of collisions.

The occurrence of a collision is experienced by comparator 4 when the voltage at the second input exceeds the reference threshold voltage at the first input. When a collision occurs, comparator 4 generates a positive signal which is stretched by the pulse stretching circuit formed by resistors 11 and 14, diode 12 and capacitor 13. In response to a positive output from comparator 4, diode 12 conducts thereby causing capacitor 13 to be charged by the dc signal source through resistor 11. Capacitor 13 and resistor 14 are selected to case a slow discharge of the charge built up on capacitor 13 after diode 12 becomes non-conducting. In essence, the output signal generated by comparator 4 is stretched to be sufficiently long for electrical detection by utilization circuit 15. Elements 11, 12, 13 and 14 can be alternatively implemented by standard multivibrator circuits.

In an example from experimental practice, the reference threshold voltage is approximately 4.8 volts for a 5.0 volt source accounting for the diode drop in the line driver and a small noise margin. Resistors 1 and 2 are chosen to develop this reference threshold voltage and resistor 2 together with capacitor 3 exhibit a time constant of 0.2–0.5 msec. Capacitors 6 and 7 are generally chosen to be of equal capacitance, while capacitor 8 is approximately 20 times larger than either capacitor 6 or capacitor 7. Resistor 11 is small compared with resistor 14. The time constant of the RC circuit, resistor 14 and capacitor 13, is generally greater than several tens of nanoseconds.

Figure 2:
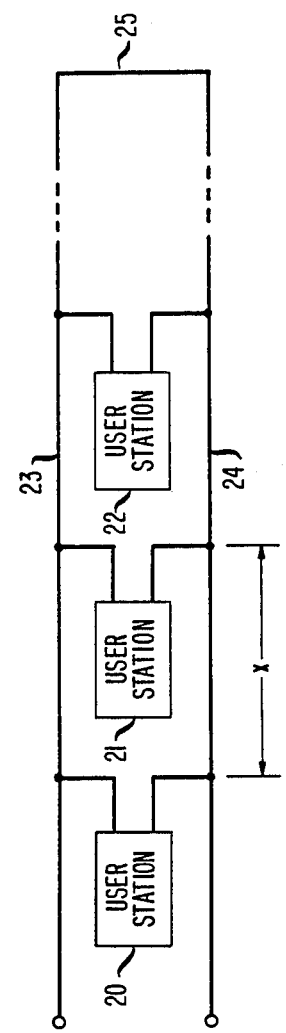
FIG. 2 is a block diagram showing a standard daisy chain node configuration connected to a two wire transmission medium.

FIG. 2 shows several stations, user stations 20 through 22, connected in daisy chain to the transmission medium comprised of transmission path 23 and receiving path 24. Loop back path 25 provides a return path between transmitting and receiving paths of the daisy chain. For the example described above wherein the transmission is twisted pair wire, each path includes one pair of wires. The embodiment of the invention shown in FIG. 1 has output terminals 17-1 and 17-2 connected to transmission path 23. FIG. 2 also includes a distance shown as x between user stations 20 and 21. This distance is of importance to FIG. 3.

Figure 3:
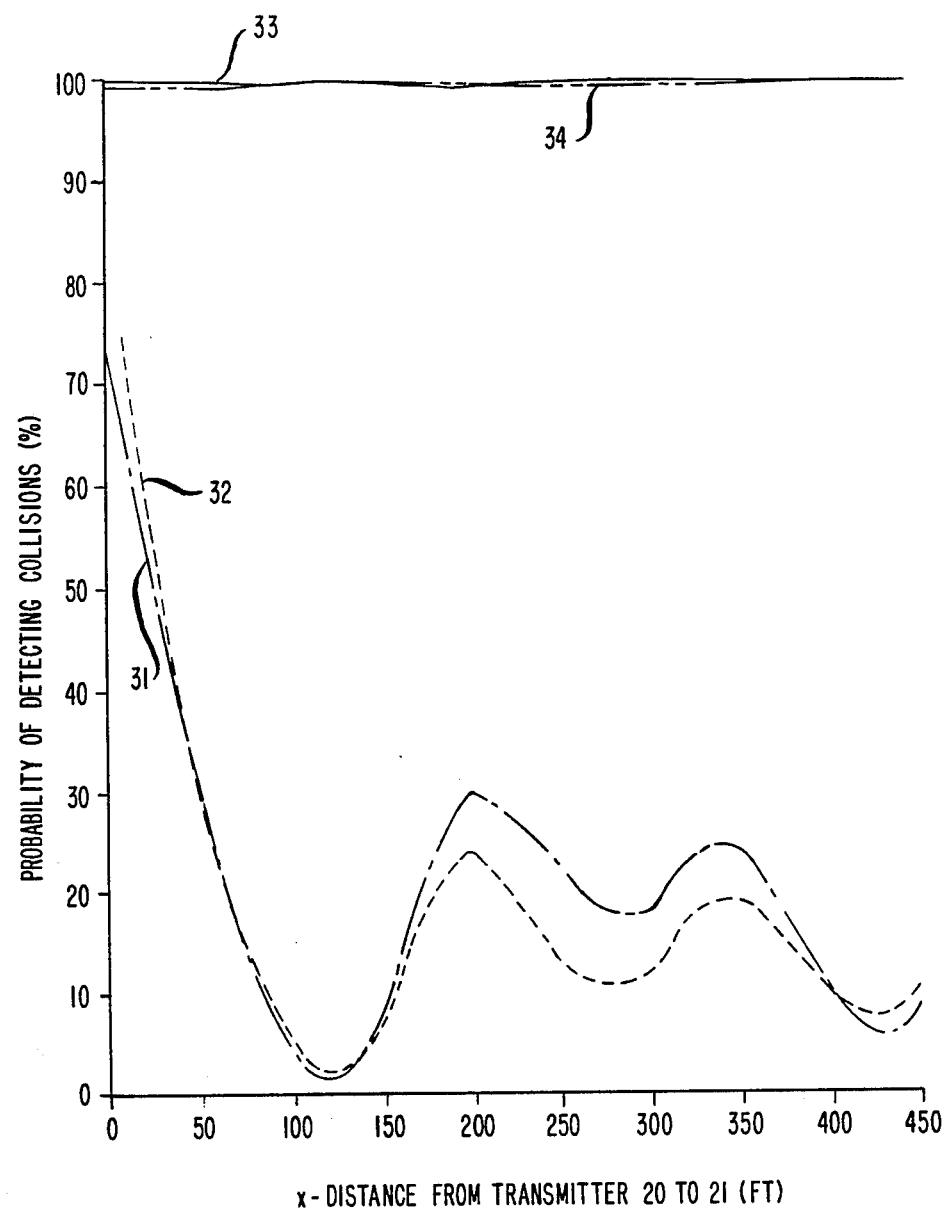
FIG. 3 shows a comparison of combined lost carrier and Manchester code violation collision detection in the daisy chain versus level detection collision detection in the daisy chain as a function of distance between two predetermined daisy chain stations.

FIG. 3 is a plot of experimental data taken on a daisy chain having three user stations. The plots show the probability of detecting collisions versus the distance between two predetermined user stations. Transmitting user stations 20 and 21 are separated by a variable distance x. All other interstation distances are fixed and small, approximately ten (10) feet each. Curves 31 and 32 show the probability of detecting collisions when combined lost carrier and Manchester violation detection techniques are used in the daisy chain. Curves 33 and 34 show the probability of detecting collisions when the level detection technique of this invention is used in the daisy chain. It is clear that, regardless of interstation distance, the level detection collision detection technique embodied by this invention is superior to the standard techniques used for collision detection in daisy chain configurations.

What is claimed is:

1. A collision detection arrangement for generating an output signal to indicate the occurrence of a collision between data signals transmitted from two or more stations in a network having a plurality of stations connected to a transmission medium in a daisy chain configuration wherein each station includes said collision detection arrangement, said collision detection arrangement comprising driver means for generating a transmit data signal, means having a first port connected to an output of said driver means and having a second port connected to a transmit portion of said transmission medium for ac-coupling said transmit data signal to said transmission medium and for ac-coupling data signals from said transmit portion of the transmission medium to said first port, means for generating a predetermined threshold, and means connected to said first port of said ac-coupling means for comparing said predetermined threshold to a transient level of a combination of the transmit data signal and the data signals coupled from the transmission medium to generate the output signal when the predetermined threshold is exceeded.

2. The collision detection arrangement defined in claim 1 wherein the arrangement further includes pulse shaping means for increasing the duration of the output signal from the comparing means.

3. The collision detection arrangement defined in claim 1 wherein the driver means further includes a line driver for generating the transmit data signal and the means for providing ac-coupling further includes a coupling transformer, the output of the line driver driver being connected to the comparing means and to the coupling transformer.

4. The collision detection arrangement defined in claim 3 wherein the arrangement further includes pulse shaping means for increasing the duration of the output signal from the comparing means.

* * * * *